(12) United States Patent
Smith (10) Patent No.: US 11,215,530 B2
(45) Date of Patent: Jan. 4, 2022

(54) ENGINE HEALTH DIAGNOSIS AND FAULT ISOLATION WITH CRANKING TEST

(71) Applicant: Cummins Inc., Columbus, IN (US)

(72) Inventor: Daniel J. Smith, Columbus, IN (US)

(73) Assignee: Cummins Inc., Columbus, IN (US)

( * ) Notice: Subject to any disclaimer, the term of this patent is extended or adjusted under 35 U.S.C. 154(b) by 243 days.

(21) Appl. No.: 16/434,234

(22) Filed: Jun. 7, 2019

(65) Prior Publication Data

US 2019/0285512 A1  Sep. 19, 2019

Related U.S. Application Data (63) Continuation of application No. PCT/US2017/067844, filed on Dec. 21, 2017.
(Continued)

(51) Int. Cl.
*G01M 15/09* (2006.01)
*F02D 13/02* (2006.01)
(Continued)

(52) U.S. Cl.
CPC ......... *G01M 15/09* (2013.01); *F02D 13/0203* (2013.01); *F02D 41/0072* (2013.01); *F02D 41/0077* (2013.01); *F02D 41/062* (2013.01); *F02D 41/1448* (2013.01); *F02D 41/22* (2013.01); *F02D 41/222* (2013.01); *F02N 11/10* (2013.01); *G01M 15/05* (2013.01); *G01M 15/08* (2013.01); *G01M 15/106* (2013.01);
(Continued)

(58) Field of Classification Search
CPC ............ G01M 5/09; G01M 5/08; G01M 5/05; G01M 5/106; F02D 41/062; F02D 41/1448; F02D 41/0072; F02D 41/0077; F02D 41/22; F02D 41/222; F02D 41/061; F02D 41/0055; F02D 11/10; F02D 35/023; F02D 2200/0406
See application file for complete search history.

(56) References Cited

U.S. PATENT DOCUMENTS 5,663,493 A  9/1997 Gerbert et al.
6,302,065 B1  10/2001 Davison
(Continued)

FOREIGN PATENT DOCUMENTS

CN  103016213 A  4/2014
CN  105835796 A  8/2016
(Continued)

OTHER PUBLICATIONS

Search Report and Written Opinion, PCT Appln. No. PCT/US17/67844, dated Mar. 6, 2018, 11 pgs.
(Continued)

*Primary Examiner* — George C Jin
(74) *Attorney, Agent, or Firm* — Taft Stettinius & Hollister LLP (57) ABSTRACT

Systems, apparatuses and methods for systematically executing a diagnosis and fault isolation of a failure condition for an engine during a cranking test of the engine. Examples of the failure condition include, but are not limited to, cylinder-by-cylinder compression conditions, excessive blow-by conditions, valve failures, leaks, and/or obstructions of the intake, exhausts, crankcase ventilation, and/or exhaust gas recirculation systems.

19 Claims, 5 Drawing Sheets

Related U.S. Application Data (60) Provisional application No. 62/438,508, filed on Dec. 23, 2016.

(51) Int. Cl.
    *F02D 41/00*     (2006.01)
    *F02D 41/22*     (2006.01)
    *G01M 15/10*     (2006.01)
    *G01M 15/08*     (2006.01)
    *G01M 15/05*     (2006.01)
    *F02D 41/06*     (2006.01)
    *F02N 11/10*     (2006.01)
    *F02D 41/14*     (2006.01)
    *F02D 35/02*     (2006.01)

(52) U.S. Cl.
    CPC ........ *F02D 35/023* (2013.01); *F02D 41/0055* (2013.01); *F02D 41/061* (2013.01); *F02D 2200/0406* (2013.01); *Y02T 10/40* (2013.01)

(56) References Cited

U.S. PATENT DOCUMENTS

| | | | |
|---|---|---|---|
| 6,658,865 B2 | 12/2003 | Schenk et al. | |
| 6,922,628 B2 | 7/2005 | Zhu et al. | |
| 7,529,637 B2 | 5/2009 | Snyder | |
| 7,543,485 B2 | 6/2009 | Chemello | |
| 7,631,552 B2 | 12/2009 | Keski-Hynnila et al. | |
| 7,631,626 B1 | 12/2009 | Zurawski | |
| 7,987,704 B2 | 8/2011 | Lucido et al. | |
| 8,739,766 B2 | 6/2014 | Jentz et al. | |
| 8,904,758 B2 | 12/2014 | Ikeda et al. | |
| 9,157,390 B2 | 10/2015 | Song et al. | |
| 9,657,676 B2 | 5/2017 | Glauber et al. | |
| 2003/0106366 A1* | 6/2003 | Shidara | F02M 35/10 73/114.38 |
| 2003/0121316 A1 | 7/2003 | Wakahara | |
| 2006/0053868 A1 | 3/2006 | Chung et al. | |
| 2012/0265396 A1 | 10/2012 | Makki et al. | |
| 2013/0085653 A1 | 4/2013 | Furuta et al. | |
| 2014/0238369 A1 | 8/2014 | Jankovic et al. | |
| 2014/0261343 A1 | 9/2014 | Martin et al. | |
| 2014/0277998 A1 | 9/2014 | Martin et al. | |
| 2014/0379206 A1* | 12/2014 | Martin | F02D 41/042 701/32.8 |
| 2015/0136076 A1 | 5/2015 | Syles et al. | |
| 2015/0233289 A1 | 8/2015 | Younkins et al. | |
| 2016/0332620 A1 | 11/2016 | Dudar et al. | |
| 2018/0371971 A1* | 12/2018 | Nakano | G01M 3/025 |

FOREIGN PATENT DOCUMENTS

| | | |
|---|---|---|
| CN | 106150730 A | 11/2016 |
| DE | 10124166 A1 | 11/2002 |
| JP | 2010242617 A | 10/2010 |

OTHER PUBLICATIONS

First Office Action, CN Appln. Serial No. 2017800797152, dated Jul. 26, 2021, 14 pgs.

* cited by examiner

ENGINE HEALTH DIAGNOSIS AND FAULT ISOLATION WITH CRANKING TEST

CROSS-REFERENCE TO RELATED APPLICATION

The present application is a continuation of International Patent Application No. PCT/US17/67844 filed on Dec. 21, 2017, which claims the benefit of the filing date of U.S. Provisional App. Ser. No. 62/438,508 filed on Dec. 23, 2016, each of which is incorporated herein by reference.

TECHNICAL FIELD

The present disclosure relates generally to a diagnosis and a fault isolation of an engine failure, and more particularly but not exclusively to a systematic diagnosis and fault isolation of an engine failure during an engine cracking.

BACKGROUND

In a vehicle with an engine, particularly an internal combustion engine, the capability of diagnosing and isolating a failure of the engine is imperative to an efficient and accurate repair and maintenance of the engine. Therefore, further improvements in diagnosis and fault isolation of an engine is needed.

SUMMARY

The present disclosure describes systems, apparatuses and methods for systematically executing a diagnosis and fault isolation of a failure condition for an engine during a cranking of the engine while the engine is disabled from starting. Examples of the failure conditions include, but are not limited to, a cylinder-by-cylinder compression conditions, an excessive blow-by, valve failures, intake leaks, exhaust leaks, exhaust gas recirculation (EGR) system leaks, obstructed intake system, obstructed exhaust system, obstructed EGR system, and/or obstructed or leaking crankcase ventilation system.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

The present invention is primarily intended for use in engine health diagnosis and fault isolation of engines, such as those used with vehicles or those used in stationary applications such as a genset. Nonetheless, in practice, the present invention may be utilized in any type of systems, apparatuses and devices suitable for diagnosis and fault isolation of a failure by an engine in accordance with the examples described herein.

Figure 1A:
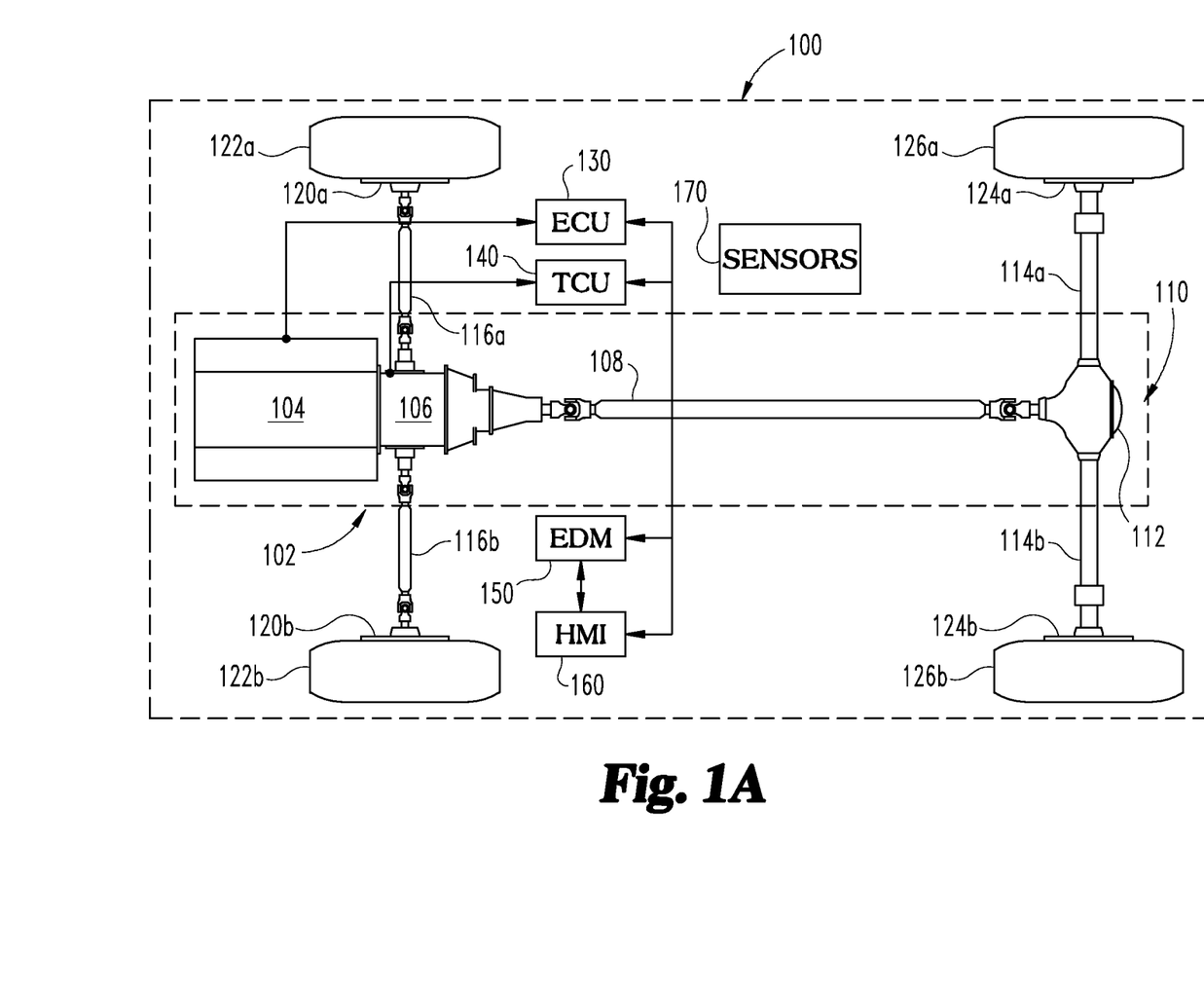
FIG. 1A is a schematic block diagram of an exemplary vehicle system.

With reference to FIG. 1A, there is illustrated a schematic view of an exemplary vehicle system 100 including a powertrain 102 incorporated within vehicle system 100. In the illustrated embodiment, the powertrain 102 includes an engine 104, such as an internal combustion engine, structured to generate power for the vehicle system 100. The powertrain 102 further includes a transmission 106 connected to the engine 104 for adapting the output torque of the engine 104 and transmitting the output torque to a drive shaft 108. In certain embodiments, the transmission 106 may be connected to an engine crankshaft via a torque converter, a flywheel, a gearbox, and/or a clutch, which are not shown to preserve clarity.

In the rear wheel drive configuration illustrated in vehicle system 100, the powertrain 102 includes a final drive 110 having a rear differential 112 connecting the drive shaft 108 to rear axles 114a, 114b. It is contemplated that the components of powertrain 102 may be positioned in different locations throughout the vehicle system 100. In one non-limiting example of a vehicle system 100 having a front wheel drive configuration, transmission 106 may be a transaxle and final drive 110 may reside at the front of the vehicle system 100, connecting front axles 116a and 116b to the engine 104 via the transaxle. It is also contemplated that in some embodiments the vehicle system 100 is in an all-wheel drive configuration.

Vehicle system 100 and/or engine 104 includes an electronic or engine control unit (ECU) 130, sometimes referred to as an electronic or engine control module (ECM), or the like, which is directed to regulating and controlling the operation of engine 104. A transmission control unit (TCU) 140 is illustrated in vehicle system 100, which is directed to the regulation and control of transmission 106 operation. ECU 130 and/or TCU 140 are each in electrical communication with a plurality of sensors 170 in vehicle system 100 and/or engine 104 for receiving and transmitting conditions of vehicle system 100 and/or engine 104, such as temperature and pressure conditions, for example. In certain embodiments, the ECU 130 and the TCU 140 may be combined into a single control module, commonly referred to as a powertrain control module (PCM) or powertrain control unit (PCU), or the like. It is contemplated that ECU 130 and/or TCU 140 may be integrated within the engine 104 or transmission 106, respectively. Other various electronic control units for vehicle subsystems are typically present in vehicle system 100, such as a braking system electronic control unit and a cruise control electronic control unit, for example, but such other various electronic control units are not show in vehicle system 100 to preserve clarity.

Vehicle system 100 and/or engine 104 further includes an engine diagnostic module (EDM) 150, which may be directed to the control of the operations described herein and/or directed toward an intermediary control for the regulation and control of the powertrain 102 in vehicle system 100 and/or of engine 104. In the illustrated embodiment, EDM 150 is in electrical communication with each of the ECU 130 and TCU 140. In certain embodiments, at least a portion of the EDM 150 may be integrated within the ECU 130 and/or TCU 140. EDM 150 may further be in electrical communication with one or more of the plurality of sensors 170 in vehicle system 100 and/or engine 104 for receiving and transmitting conditions of vehicle system 100 and/or engine 104, such as temperature and pressure conditions, for example. It is contemplated that at least a portion of the conditions and/or measured inputs used for interpreting signals by the EDM 150 may be received from ECU 130 and/or TCU 140, in addition to or alternatively to the plurality of sensors 170. Furthermore, the EDM 150 may include a processor or controller and be a control unit.

Figure 2:
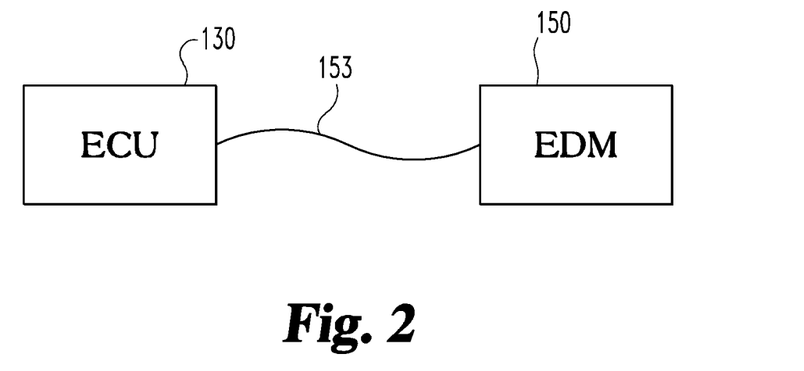
FIG. 2 is a schematic block diagram of an exemplary connection between an engine controller and an engine diagnostic module.

Alternatively, EDM 150 may be external to vehicle system 100 and/or engine 104 (e.g., a component of a vehicle diagnostic system at a maintenance/repair shop) and accessible by ECU 130 via a datalink 153 as symbolically shown in FIG. 2.

In certain embodiments, any or all of the ECU 130, TCU 140, and EDM 150 may be electronically communicatively coupled to a human-machine interface (HMI) 160, also commonly referred to as a man-machine interface (MMI), a human-computer interaction (HCI), an operator interface console (OIC) or terminal (OIT), or the like. The HMI 160 provides an interface for a human-machine interaction between an operator and one or more input, output, or combination peripheral interface devices (not shown). Example input peripheral interface devices include a sensor, a button, a microphone, a keyboard, a track pad, and a mouse. Examples of output peripheral interface devices include a display monitor, an indicator light, a printer, and a speaker. An example of a combination peripheral interface device includes a display monitor with touchscreen capability.

In one embodiment, HMI 160 interprets signals from each of ECU 130, TCU 140, and EDM 150 and displays them to the operator on the one or more output peripheral interface devices, generally via a graphical user interface (GUI), which provide graphical representations of the interpreted signals in a user readable form. In certain embodiments, the one or more input peripheral interface devices receive operator generated commands and transmit the commands to the HMI 160, where the HMI interprets the commands and relays signals to ECU 130, TCU 140, and/or EDM 150. Certain embodiments of the graphical representations displayed via the GUI are discussed in further detail below. Other means of representing the interpreted signals to the operator in addition to or alternatively to the GUI are contemplated, such as via one or more indicator lights, tactile feedback, and/or audible sounds.

In the illustrated embodiment, vehicle system 100 includes two front brakes 120a, 120b each positioned between and operably connected to two front wheels 122a, 122b and front axles 116a, 116b, respectively. Vehicle system 100 further includes two rear brakes 124a, 124b each positioned between two rear wheels 126a, 126b and rear axles 114a, 114b, respectively. It is contemplated that vehicle system 100 may have more or fewer tires and brakes than illustrated in FIG. 1A. In still other embodiments, the engine 104 is provided without a vehicle in a stationary application, or in a marine application.

Figure 1B:
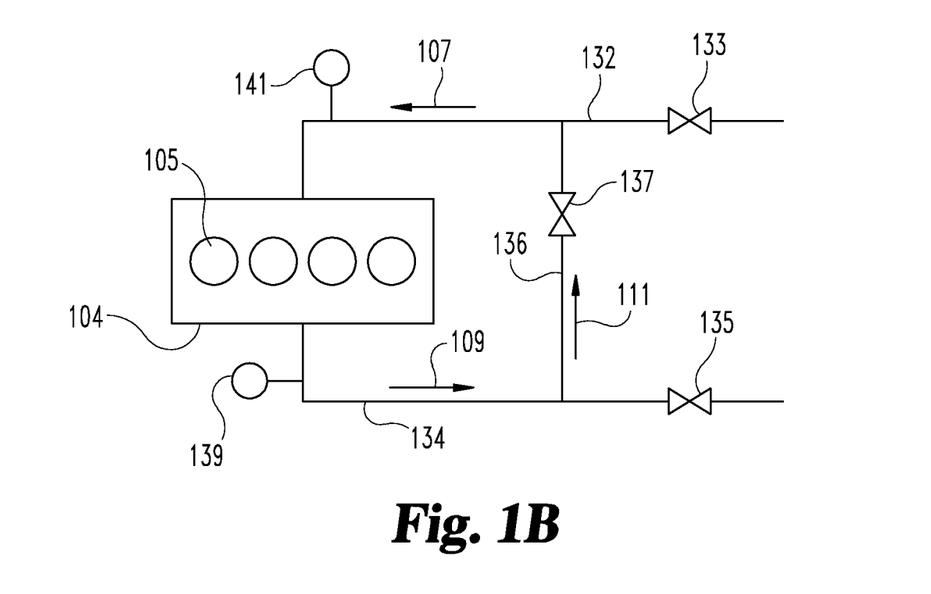
FIG. 1B is a schematic block diagram of an exemplary engine.

Vehicle system 100 and/or engine 104 may also include various components not shown, such as a fuel system including a fuel tank, a front differential, a braking system, and a suspension. Furthermore, as shown in FIG. 1B, engine 104 may include a plurality of cylinders 105 to receive an intake flow 107 from an engine intake system 132 and produce and exhaust flow 109 to an exhaust system 134, which may include an exhaust aftertreatment system (not shown). Engine 104 may also include an exhaust gas recirculation system (EGR) 136 for an EGR flow 111. Each of the intake system, exhaust system and EGR system 132, 134, 136 includes a valve to control flow, such as an intake throttle type of intake valve 133, an exhaust valve 135 such as an exhaust throttle or wastegate or variable geometry turbo inlet, and an EGR valve 137, respectively, to name just a few examples.

In practice, EDM 150 implements one or more tests that gather and analyze information using engine cranking to diagnose and isolate one or more of several possible failures of engine 104. The goal of the test(s) is to detect and isolate failures of as many different parts and systems on the engine 104 as possible within one or more short cranking periods (approximately 30 seconds for an engine 104 in an automotive size range) where engine starting is prevented during the test by disabling fuel and/or ignition systems. Excessive battery drain during cranking can also be avoided by disabling one or more of the charge flow heating devices, such as intake heaters or glow plugs. Multiple cranking events can be separated by a starter cooldown period that is initiated in response to a temperature condition of a starter that performs the engine cranking. The tests and procedures disclosed herein are suitable for conventional spark ignited or compression ignition engines with computer control without mechanical modification or changes in the starting, electrical, or electronics system.

The test execution by EDM 150 may include connecting EDM 150 via a data link to an electronic service tool if needed. An initialization procedure can also be provided where EDM 150 is configured to wait for a user command to start the diagnostic test(s), check initial abort conditions, disable functionality that would allow engine to start or would excessively drain battery during extended cranking, and override actuator commands for the intake valve 133, exhaust valve 135, and EGR valve 137.

The EDM 150 may then provide an output or command to prompt the user to crank the engine 104 for a specified time period. EDM 150 can monitor the cranking time and one or more abort conditions while stepping through different actuator positions for intake valve 133, exhaust valve 135, and EGR valve 137 to enable diagnosis of different failure modes.

In one embodiment, EDM 150 is configured to control the performance of a series of diagnostic tests for engine 104. The tests may include, in no particular order, a compression and/or exhaust leak test, an intake leak test, and an EGR effective area test. For the compression and/or exhaust leak test, intake valve 133 is opened, and exhaust valve 135 and EGR valve 137 are closed. For the intake leak test, intake valve 133 is closed, EGR valve 137 is closed, and exhaust valve 135 is opened. For the EGR effective area test, the intake valve 133 is closed, the exhaust valve 135 is closed, and the EGR valve 137 is sequentially opened through a sequence of EGR valve positions.

EDM 150 is further configured to indicate to the user when test is complete or a starter cooldown period is required so cranking can be stopped. If the test is incomplete due to starter cooldown requirements, EDM 150 can provide an output or command to indicate when the user should begin cranking again to resume the testing. Once the testing is complete, EDM 150 can restore functionality for starting of engine 104 by, for example, enabling fueling, ignition, and charge heating and disabling actuator overrides for the intake valve 133, exhaust valve 135, and EGR valve 137. EDM 150 can further provide an output of the test results.

The EDM 150 includes stored data values, constants, and functions, as well as operating instructions stored on, for example, a computer readable medium. Any of the operations of exemplary procedures described herein may be performed at least partially by the EDM 150 or by one or more modules or submodules of EDM 150. In certain embodiments, the controller includes one or more modules structured to functionally execute the operations of the controller. The description herein including modules emphasizes the structural independence of the aspects of the EDM 150, and illustrates one grouping of operations and responsibilities of the EDM 150. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 3. Operations illustrated are understood to be exemplary only, and operations may be combined or divided, and added or removed, as well as re-ordered in whole or part, unless stated explicitly to the contrary herein.

Figure 3:
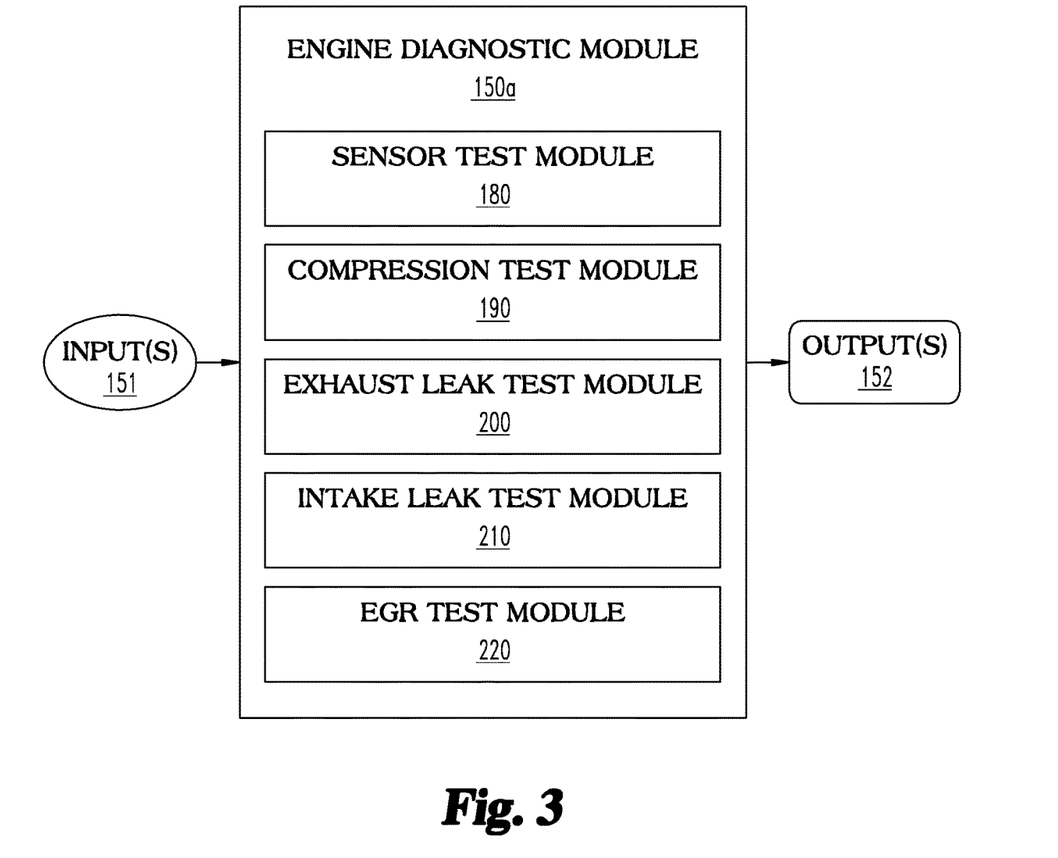
FIG. 3 is a schematic block diagram of an exemplary engine diagnostic module.

Referring to FIG. 3, one embodiment 150a of EDM 150 processes inputs signals 151 from ECU 130 (FIG. 1A) and/or sensors 170 (FIG. 1A) to generate output signals 152 informative of the results of the testing. To this end, EDM 150a includes a sensor test module 180, a compression test module 190, an exhaust leak test module 200, an intake leak test module 210 and an EGR test module 220.

Sensor test module 180 can be configured to gather data prior to starting cranking on various sensors that allows an initial check of values to ensure sensor readings are rational. Sensor test module 180 can also be configured to provide reference pressures for measurement of pressure changes due to cranking with different actuator positions intake valve 133, exhaust valve 135, and EGR valve 137 at the various stages of the test. Using these references reduces the effect of small sensor drifts on test results.

Compression test module 190 is configured so that a relative compression can be estimated, such as by using high speed measurements of battery voltage along with engine position sensor and cam position sensor tooth count and timing. Actuators for intake valve 133, exhaust valve 135, and EGR valve 137 are set to positions that allow sufficient charge density for compression effort for cylinders 105 to be measured. From the cam and crankshaft position sensor information, raw engine position, speed, and acceleration are calculated. There are at least three different ways to use this data, depending on the application configuration, as described below with reference to FIGS. 4 and 5.

Figure 4:
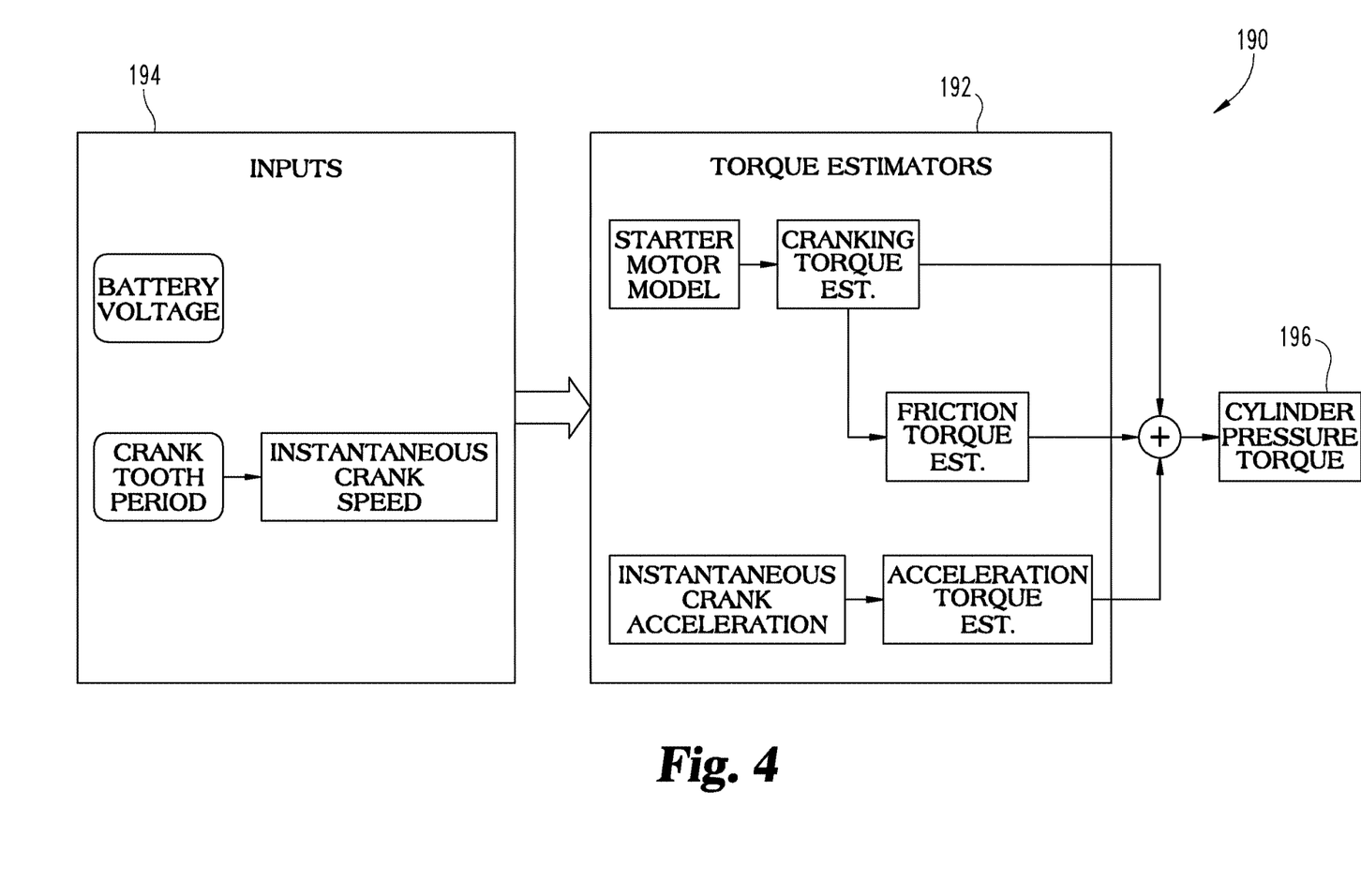
FIG. 4 is a schematic flow diagram of an exemplary process for determining a cylinder pressure torque.

For applications in which the starter motors and speed (gear) ratios of the motors to the crankshaft are well known and not significantly subject to change for an application, a process for EDM 150 to determine three torque components is shown in FIG. 4. A torque estimator 192 of compression test module 190 receives inputs 194 of battery voltage and crank tooth period/instantaneous crank speed of the starter. Torque estimator 192 determines cranking torque based on a model of the starter motor, engine configuration information, and the speed of the starter motor. Using a model of the starter motor, the voltage and speed provide enough information to calculate starter torque. From starter torque, engine cranking torque is estimated. Friction torque is then calculated as the average torque when the cranking speed reaches quasi-steady state. Inertial torque is calculated using the moment of inertia of the engine 104 and the crankshaft acceleration. Since sum of the torque components on the engine 104 is equal zero, the torque due to compression (cylinder pressure torque 196) is assumed to be a fourth term, and is therefore the negative of the sum of the cranking torque estimate, the friction torque estimate, and the acceleration torque estimate.

Figure 5:
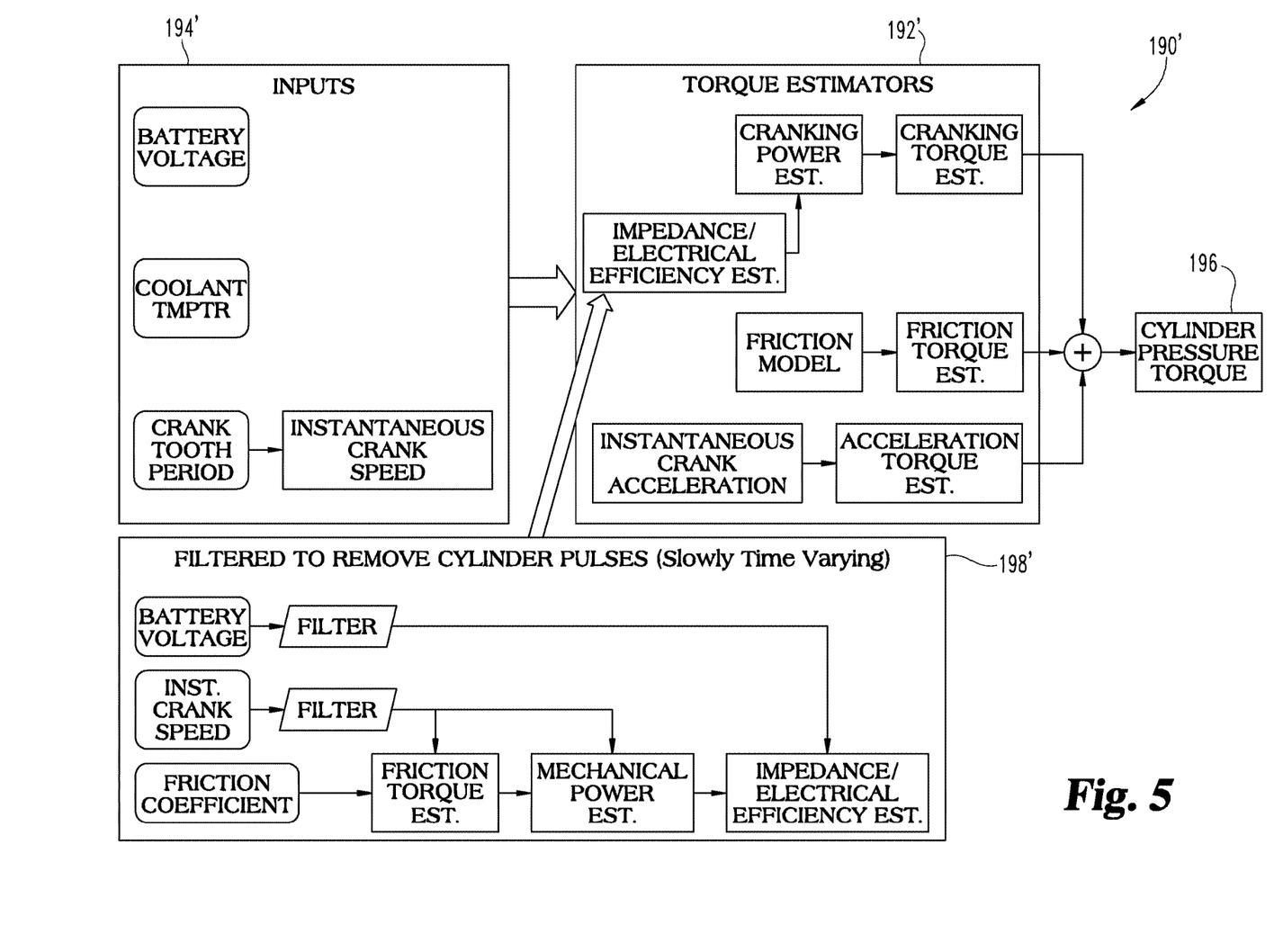
FIG. 5 is a schematic flow diagram of another exemplary process for determining a cylinder pressure torque.

For applications subject to variability in starter or starter to crankshaft speed (gear) ratios, compression test module 190' can include an engine friction model to calculate friction torque of the engine 104 and an impedance term of the starter electrical system as shown in FIG. 5. Compression test module 190' is similar to compression test module 190, but its inputs 194' further include a coolant temperature input. A filter 198' is also provided to determine an impedance/electrical efficiency estimate with cylinder pulses removed. Compression test module 190' is configured to calculate the impedance term or electrical efficiency estimate based on a filtered friction torque estimate and filtered engine/mechanical power estimate. The filtered friction torque estimate is determined using a model as a direct function of coolant temperature and filtered engine speed based on the instantaneous crank speed. Filtered engine/mechanical power is determined from the filtered friction torque estimate and filtered engine speed. Mechanical power is then estimated to be the electrical power scaled by an electrical efficiency. The filtering therefore provides a linearized calculation about the quasi-steady state cranking operating point. Using filtered battery voltage with calculated filtered electrical power allows direct calculation of a starter system characteristic representing impedance divided by electrical efficiency.

Using the impedance term along with a friction model and moment of inertia for engine 104, the three torque components are calculated by torque estimator 192' similarly to torque estimator 192. The cranking torque estimate is determined by using the impedance/electrical efficiency estimate. Assuming the cranking torque is approximately constant relative to cylinder to cylinder fluctuations during cranking, the calculation is reversed, but instead of using filtered values for speed, friction and voltage, the dynamic values are used with the impedance/electrical efficiency estimate to calculate cranking power estimate, which, with engine speed, is used to determine the cranking torque estimate. The friction torque estimate is directly determined from the friction torque model using engine speed and coolant temperature. The inertial or acceleration torque estimate is calculated using moment of inertia of the engine and the instantaneous crankshaft acceleration. Since sum of the torque components on the engine is equal zero, the torque due to compression (cylinder pressure torque 196') is assumed to be a fourth term, and is therefore the negative of the sum of the cranking, friction and acceleration torque estimates.

In embodiments where the engine friction and starter configuration both experience high variability, using the same signal processing and decision logic directly on the calculated instantaneous engine speed is a third process for determining the cylinder pressure torque.

Compression test module 190, 190' of EDM 150 is configured to use one of the resulting compression signatures of the cylinder pressure torque as determined above. The compression effort for each cylinder 105 of engine 104 during the compression test is calculated by individually integrating portions of the crank angle segment where each cylinder 105 has the most effect. This results in an integrated compression effort value for each cylinder 105. Cylinder-to-cylinder interaction effects due to overlapping compression and power strokes on some multi-cylinder engines may be compensated for using factors calculated from prior cylinders. A reference compression value is then determined for each cylinder 105 and the integrated compression effort value is divided by this reference compression to yield relative compression for each cylinder 105 with respect to the reference compression value. The relative compression for each cylinder 105 is then compared to a threshold, indicating if any cylinders 105 are determined to be failed.

Exhaust leak test module 200 is configure to execute an exhaust leak test involving closing the exhaust valve 135 and the EGR valve 137. This effectively creates a sealed volume in the exhaust system 134. During cranking some pressure is built up, and can be measured accurately using an exhaust pressure sensor 139. If pressure fails to build up to a certain level, or within a certain time, an exhaust leak is identified within the sealed volume. If a leak is identified in the intake side as well during the intake test, the leak is likely an EGR valve leak. Depending on the exhaust valve actuator type, it may be possible to combine the exhaust leak test and the compression test to shorten the cranking time required. For example, a variable geometry turbocharger type of exhaust valve 135, because of its relatively lesser sealing capability as compared to an exhaust throttle, does not significantly affect the compression torque when closed, allowing combining of the test stages.

Intake leak test module 210 is configured to execute an intake leak test conducted in a very similar manner to the exhaust leak test. The intake valve 133 is closed, EGR valve 137 us closed, and exhaust valve 135 is opened. Charge pressure is monitored by intake pressure sensor 141 and a failure is indicated if the pressure fails to fall below a certain level within a certain period of time. Comparing the results of intake exhaust leak tests can yield an indication of EGR valve failures. Comparing pressure sensor readings during the intake and exhaust leak tests as well as prior to cranking may be able to further provide pressure sensor rationality diagnostic signatures on the intake, exhaust, and EGR orifice/orifice delta pressure sensors.

EGR test module 220 detects obstructions in the EGR flow circuit. In this cranking period the intake valve 133 is closed and the exhaust throttle 135 is closed. The EGR valve 137 is then stepped from open to closed at a defined set of levels for prescribed times. This forces all flow through the EGR loop and compares the effective area of the EGR circuit to that of the EGR valve closed to various levels. Comparison of the difference in steady state charge pressure and amplitudes of the pulses due to individual cylinder pumping in the charge pressure from one EGR valve position to the next gives information about the flow area of the EGR circuit without relying on an absolute pressure measurement that is subject to various noise factors including ambient pressure variability and small sensor drifts. Further, comparison of each step relative to the values gathered at the initial sensor check step can provide absolute quantification.

Possible variants of the configuration of EDM 150 include one or more of the following. Identifiable failure modes can be provided. A complete test sequence using a service tool to log data and execute overrides so ECM firmware does not need modification can also be provided. In some embodiments, the test can be executed and results viewed wirelessly and/or remotely, for example, using a vehicle telematics system or using a mobile device application with wired or wireless adapter. In other embodiments, the test can be executed from an automotive scan tool with results reported via standardized datalink communication, such as diagnostic trouble codes and related information.

In other embodiments, EDM is configured to execute the test without additional datalinks to the vehicle. For example, existing vehicle-machine human interfaces can be used to trigger tests, give instructions, and report status and results. This could be through advanced digital dashboard displays and buttons, or simple systems like key switch commands to trigger the test and malfunction indicator lamp flashing and illuminating to report test results. In another embodiment, complete data analysis and/or fault indication and isolation is formed using firmware on ECU 130 and/or EDM 150. In another embodiment, an additional blocking device is added in the intake and/or exhaust flow path to allow diagnosis of leaks in the entire intake or exhaust flow path, as opposed to just the portions within boundary defined by the intake valve 133 and exhaust valve 135. In yet another embodiment, for engines where the ECU 130 has the ability to control cranking, the cranking can be autonomously controlled without direct user control.

Various aspects of the present disclosure are contemplated. According to one aspect, a method includes disabling an engine from starting; cranking the engine while the engine is disabled from starting; and diagnosing one or more conditions of the engine during the cranking based on a pressure condition of the engine during the cranking. The one or more conditions include at least one of a compression torque in one or more cylinders of the engine, a leak in an intake system of the engine, a leak in an exhaust system of the engine, and a flow condition in an EGR system.

In one embodiment, the method includes determining one or more reference pressures for the engine before cranking the engine. In another embodiment, the method includes aborting the cranking of the engine in response to a cranking time exceeding a threshold amount.

In a further embodiment, the method includes closing an EGR valve of the EGR system, opening the intake valve of the intake system, and opening an exhaust valve of the exhaust system during the cranking of the engine to determine at least one of the compression torque and the leak in the exhaust system. In yet another embodiment, the method includes closing the intake valve, closing the EGR valve and opening the exhaust valve during the cranking of the engine to determine the leak in the intake system. In still another embodiment, the method includes closing the intake valve, closing the exhaust valve, and sequentially positioning the EGR valve between open and closed positions during the cranking of the engine to determine the flow condition of the EGR system.

In another embodiment, where the compression torque is determined for each one of a plurality of cylinders of the engine, the method includes determining a compression value for each of the plurality of cylinders based on a reference compression amount, and further includes comparing the compression value for each cylinder to a threshold for each of the plurality of cylinders. In a further embodiment, the method includes terminating the cranking of the engine in response to a temperature condition of a starter while cranking the engine, cooling the starter, and resuming the cranking after the starter cools to diagnose the one or more conditions.

According to another aspect, an apparatus is provided that includes an engine controller operable during a cranking of an engine with the engine disabled from starting. The engine controller includes one or more engine diagnostic modules comprising at least one of the following: a compression test module configured to estimate a compression torque of the engine during the cranking and to designate the estimated compression torque as a passing compression torque or a failing compression torque, an exhaust leak test module configured to identify an exhaust leak in an exhaust system of the engine in response to an exhaust pressure during the cranking of the engine, an intake leak test module configured to identify an intake leak in an intake system of the engine in response to an intake pressure during the cranking of the engine, and an exhaust gas recirculation test module configured to identify an effective flow area of an exhaust gas recirculation EGR system of the engine in response to a flow through the EGR system during the cranking of the engine.

In one embodiment, the engine controller is configured to monitor a cranking time and abort the cranking of the engine in response to the cranking time exceeding a threshold amount. In another embodiment, the one or more engine diagnostic modules includes two or more of the compression test module, the exhaust leak test module, the intake leak test module, and the exhaust gas recirculation test module. In yet another embodiment, the one or more engine diagnostic modules includes three or more of the compression test module, the exhaust leak test module, the intake leak test module, and the exhaust gas recirculation test module. In still another embodiment, the one or more engine diagnostic modules includes each of the compression test module, the exhaust leak test module, the intake leak test module, and the exhaust gas recirculation test module.

In another embodiment, the apparatus includes an intake valve in the intake system, an exhaust valve in the exhaust system, and an EGR valve in the EGR system. In a refinement of this embodiment, the one or more engine diagnostic modules includes the compression test module and the compression test module is configured to close the EGR valve, open the intake valve and open the exhaust valve during the cranking of the engine. In another refinement, the one or more engine diagnostic modules includes the exhaust leak test module and the exhaust leak test module is configured to close the EGR valve, open the intake valve and open the exhaust valve during the cranking of the engine. In yet another refinement, the one or more engine diagnostic modules includes the intake leak test module and the intake leak test module is configured to close the intake valve, close the EGR valve and open the exhaust valve during the cranking of the engine. In another refinement, the one or more engine diagnostic modules includes the exhaust gas recirculation test module and the exhaust gas recirculation test module is configured to close the intake valve, close the exhaust valve, and sequentially position the EGR valve between open and closed positions during the cranking of the engine.

In another embodiment, the one or more engine diagnostic modules includes a sensor test module configured to execute a rationality check of at least one sensor operatively coupled to the engine before the cranking of the engine. In a refinement of this embodiment, the sensor test module is further configured to determine one or more reference pressures for the intake system, the exhaust system and the EGR system for determination of pressure changes during the cranking of the engine.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    disabling an engine from starting;
    cranking the engine while the engine is disabled from starting;
    terminating the cranking of the engine in response to a temperature condition of a starter while cranking the engine, cooling the starter, and resuming the cranking after the starter cools to diagnose one or more conditions of the engine; and
    diagnosing the one or more conditions of the engine during the cranking based on a pressure condition of the engine during the cranking, wherein the one or more conditions include at least one of a compression torque in one or more cylinders of the engine, a leak in an intake system of the engine, a leak in an exhaust system of the engine, and a flow condition in an exhaust gas recirculation (EGR) system, wherein the diagnosing includes manipulating one or more actuators operably coupled to the intake, exhaust, and EGR systems during the cranking.

2. The method of claim 1, further comprising determining one or more reference pressures for the engine before cranking the engine.

3. The method of claim 1, further comprising aborting the cranking of the engine in response to a cranking time exceeding a threshold amount.

4. A method, comprising:
    disabling an engine from starting;
    cranking the engine while the engine is disabled from starting;
    diagnosing one or more conditions of the engine during the cranking based on a pressure condition of the engine during the cranking, wherein the one or more conditions include at least one of a compression torque in one or more cylinders of the engine, a leak in an intake system of the engine, a leak in an exhaust system of the engine, and a flow condition in an exhaust gas recirculation (EGR) system, wherein the diagnosing includes manipulating one or more actuators operably coupled to the intake, exhaust, and EGR systems during the cranking; and
    further comprising closing an EGR valve of the EGR system, opening the intake valve of the intake system, and opening an exhaust valve of the exhaust system during the cranking of the engine to determine at least one of the compression torque and the leak in the exhaust system.

5. A method, comprising:
disabling an engine from starting;
cranking the engine while the engine is disabled from starting;
diagnosing one or more conditions of the engine during the cranking based on a pressure condition of the engine during the cranking, wherein the one or more conditions include at least one of a compression torque in one or more cylinders of the engine, a leak in an intake system of the engine, a leak in an exhaust system of the engine, and a flow condition in an exhaust gas recirculation (EGR) system, wherein the diagnosing includes manipulating one or more actuators operably coupled to the intake, exhaust, and EGR systems during the cranking; and
further comprising closing the intake valve, closing the EGR valve and opening the exhaust valve during the cranking of the engine to determine the leak in the intake system.

6. A method, comprising:
disabling an engine from starting;
cranking the engine while the engine is disabled from starting;
diagnosing one or more conditions of the engine during the cranking based on a pressure condition of the engine during the cranking, wherein the one or more conditions include at least one of a compression torque in one or more cylinders of the engine, a leak in an intake system of the engine, a leak in an exhaust system of the engine, and a flow condition in an exhaust gas recirculation (EGR) system, wherein the diagnosing includes manipulating one or more actuators operably coupled to the intake, exhaust, and EGR systems during the cranking; and
further comprising closing the intake valve, closing the exhaust valve, and sequentially positioning the EGR valve between open and closed positions during the cranking of the engine to determine the flow condition of the EGR system.

7. The method of claim 1, wherein the compression torque is determined for each one of a plurality of cylinders of the engine, and further comprising determining a compression value for each of the plurality of cylinders based on a reference compression amount, and further comprising comparing the compression value for each cylinder to a threshold for each of the plurality of cylinders.

8. An apparatus, comprising:
an engine controller operable during a cranking of an engine with the engine disabled from starting, the engine controller including one or more engine diagnostic modules comprising at least one of:
  a compression test module configured to estimate a compression torque of the engine during the cranking and to designate the estimated compression torque as a passing compression torque or a failing compression torque;
  an exhaust leak test module configured to identify an exhaust leak in an exhaust system of the engine in response to an exhaust pressure during the cranking of the engine;
  an intake leak test module configured to identify an intake leak in an intake system of the engine in response to an intake pressure during the cranking of the engine; and
  an exhaust gas recirculation test module configured to identify an effective flow area of an exhaust gas recirculation (EGR) system of the engine in response to a flow through the EGR system during the cranking of the engine.

9. The apparatus of claim 8, wherein the engine controller is configured to monitor a cranking time and abort the cranking of the engine in response to the cranking time exceeding a threshold amount.

10. The apparatus of claim 8, further comprising an intake valve in the intake system, an exhaust valve in the exhaust system, and an EGR valve in the EGR system.

11. The apparatus of claim 10, wherein the one or more engine diagnostic modules includes the compression test module and the compression test module is configured to close the EGR valve, open the intake valve and open the exhaust valve during the cranking of the engine.

12. The apparatus of claim 10, wherein the one or more engine diagnostic modules includes the exhaust leak test module and the exhaust leak test module is configured to close the EGR valve, open the intake valve and open the exhaust valve during the cranking of the engine.

13. The apparatus of claim 10, wherein the one or more engine diagnostic modules includes the intake leak test module and the intake leak test module is configured to close the intake valve, close the EGR valve and open the exhaust valve during the cranking of the engine.

14. The apparatus of claim 10, wherein the one or more engine diagnostic modules includes the exhaust gas recirculation test module and the exhaust gas recirculation test module is configured to close the intake valve, close the exhaust valve, and sequentially position the EGR valve between open and closed positions during the cranking of the engine.

15. The apparatus of claim 8, wherein the one or more engine diagnostic modules comprises two or more of the compression test module, the exhaust leak test module, the intake leak test module, and the exhaust gas recirculation test module.

16. The apparatus of claim 8, wherein the one or more engine diagnostic modules comprises three or more of the compression test module, the exhaust leak test module, the intake leak test module, and the exhaust gas recirculation test module.

17. The apparatus of claim 8, wherein the one or more engine diagnostic modules comprises each of the compression test module, the exhaust leak test module, the intake leak test module, and the exhaust gas recirculation test module.

18. The apparatus of claim 8, wherein the one or more engine diagnostic modules includes a sensor test module configured to execute a rationality check of at least one sensor operatively coupled to the engine before the cranking of the engine.

19. The apparatus of claim 18, wherein the sensor test module is further configured to determine one or more reference pressures for the intake system, the exhaust system and the EGR system for determination of pressure changes during the cranking of the engine.

* * * * *